United States Patent [19]
Adamson et al.

[11] Patent Number: 5,558,326
[45] Date of Patent: Sep. 24, 1996

[54] HOCKEY STICK BLADE COVER AND METHOD

[75] Inventors: Tamara J. Adamson; James G. Berg, both of Lino Lakes, Minn.

[73] Assignee: T3 Innovations, Inc., Lino Lakes, Minn.

[21] Appl. No.: 438,166

[22] Filed: May 9, 1995

[51] Int. Cl.⁶ .................................................. A63B 59/14
[52] U.S. Cl. ............................................................. 273/67 A
[58] Field of Search ............................................ 273/67 A

[56] References Cited

U.S. PATENT DOCUMENTS

| | | | |
|---|---|---|---|
| 2,912,245 | 11/1959 | Gardner et al. | 273/67 A |
| 3,330,011 | 7/1967 | Michael, Jr. | 24/143 |
| 3,353,826 | 11/1967 | Traverse | 273/67 A |
| 3,581,353 | 6/1971 | Sonntag | 24/143 |
| 3,716,433 | 2/1973 | Plummer | 156/85 |

OTHER PUBLICATIONS

Advertisement for "Blade Skin" hockey stick cover by Gary Freiberg Article from Jun. 8, 1995 Saint Paul Pioneer Press Dispatch entitled Inventional Wisdom (pp. 1E and 2E).
Pp. 32–37 (in particular, Rule 20–Sticks) from the National Hockey League's "Official Rules" Publication Date Not Known.

*Primary Examiner*—William H. Grieb
*Attorney, Agent, or Firm*—Dorsey & Whitney LLP

[57] ABSTRACT

The present invention provides a method for improving hockey sticks. The method includes the steps of applying a heat shrinkable film cover member to the blade of the hockey stick and exposing the cover member to a source of heat sufficiently hot to shrink it relative to the blade. The cover member is generally tubular, taking the form of an open-ended sleeve, and may include a thickened, textured portion for providing a puck contacting surface. The invention is intended to include a hockey stick carrying a shrunken heat shrinkable cover member.

19 Claims, 2 Drawing Sheets

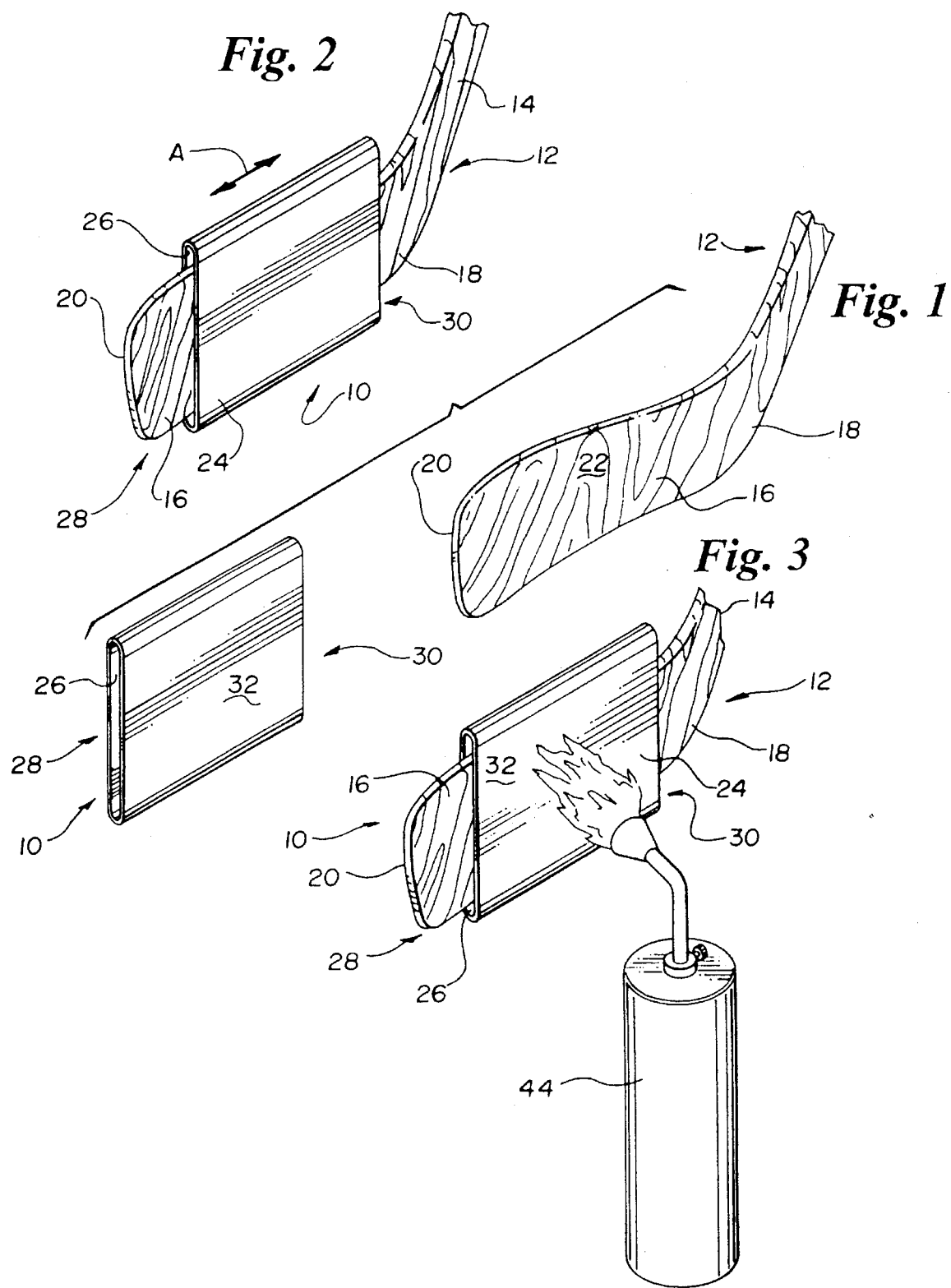

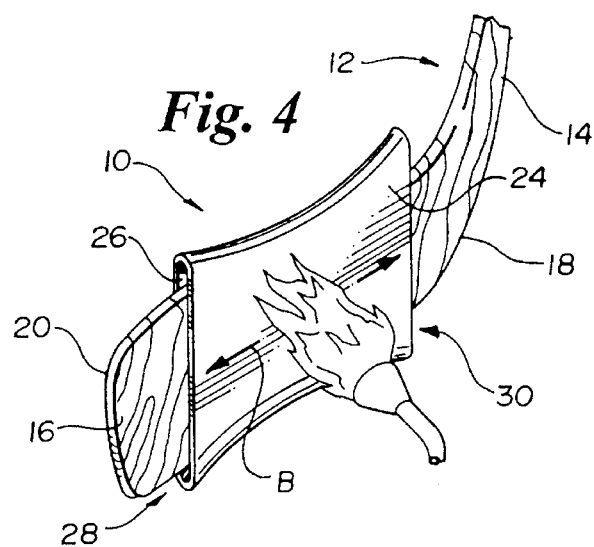
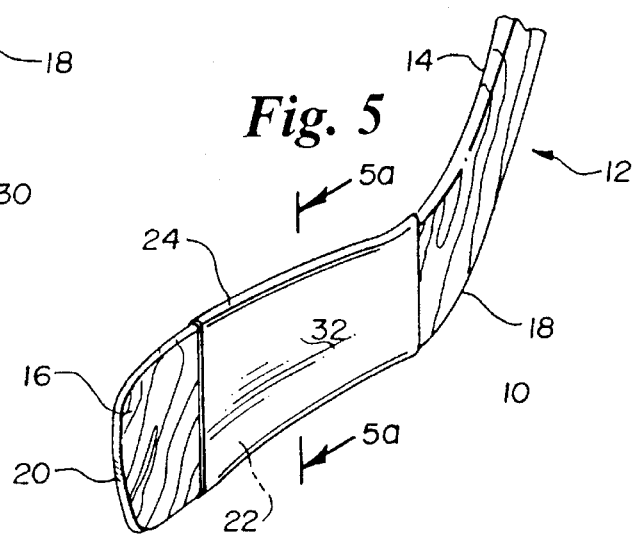
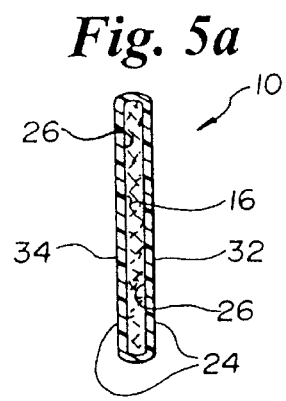
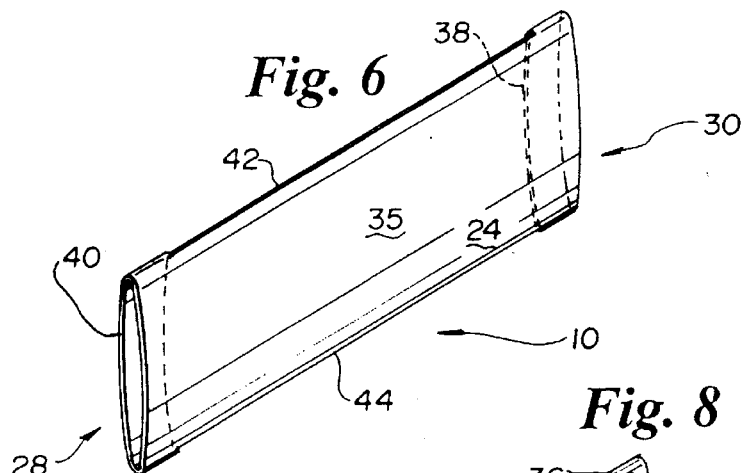
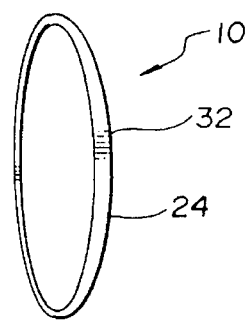
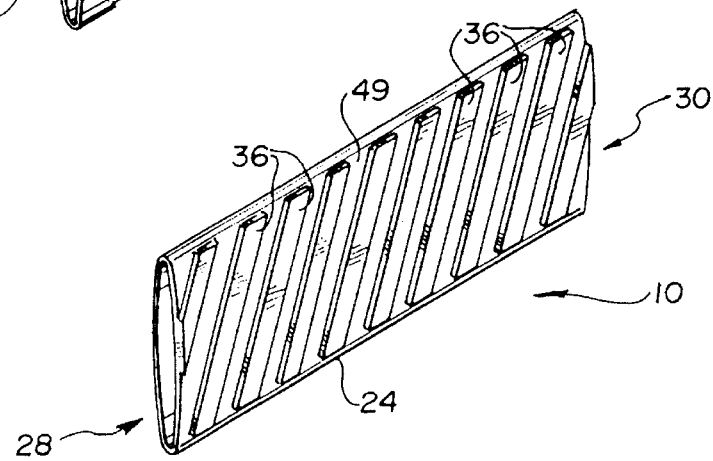

HOCKEY STICK BLADE COVER AND METHOD

TECHNICAL FIELD

The present invention relates primarily to sports equipment, particularly hockey sticks. In particular, it relates to a method for reinforcing, repairing and improving hockey sticks wherein at least the puck-contacting portion of the blade is covered by a heat shrinkable material.

BACKGROUND OF THE INVENTION

Hockey sticks are well-known sports implements used in ice hockey and in variations of ice hockey to manipulate and move a puck, ball or similar game object. A stick is typically made of wood, but also may be made partially or completely of other materials such as plastic, fiberglass and the like and, wooden sticks or blades may be overlaid with fiberglass and the like. Generally, a hockey stick type sports implement has an elongated shank with a handle grip portion at one end (the upper end) and blade at the second end (the lower end). The blade generally extends transversely outwardly away from the longitudinal central axis of the shank at between 45° to 120°. The blade may be removably connected to the shank by a mortise/tenon arrangement and is the portion of the stick implement which contacts the game object, being used to control, shoot or move the object. The One problem with hockey sticks (and other sports implements) is that repeated contact of the game object, with the blade (or game object contacting portion) causes wear thereby adversely affecting control of game object and shot accuracy. Another consequence of the repeated contact is potential failure or fracture of the blade due to impact and abrasion.

Another source of damage to the blade portion of hockey sticks is abrasion from the surface on which the game is being played, e.g., ice, grass, wood, asphalt, cement or the like. The contact of the lower edge of the blade portion of the stick with the surfaces causes significant abrasion and/or fracture. Even on ice, there is an abrasive factor.

In an attempt to solve the problems mentioned in the preceding paragraphs, i.e., wear and catastrophic failure, users of hockey stick type sports implements commonly wrap or cover the blade portion of the stick with adhesive tape or other strip adhesive material such as black friction tape, cloth tape and the like. Typically, the blade is wrapped or covered by successive layers of strip adhesive material in an overlapping spiral pattern until the blade is deemed to be covered sufficiently. While the use of tape may prolong the life of the hockey stick blade, the wrapping needs to be redone frequently, even as often as after every use of the stick implement, due to abrasion, wear or actual tearing of the tape. Another problem is that, particularly in ice hockey, the tape absorbs moisture thereby weakening it, increasing the likelihood of adhesive failure and unwrapping, and making the tape wrapped stick heavier and unbalanced.

Another reason that hockey sticks, and other sports equipment, are wrapped or taped is to improve their performance when striking or moving a game object such as a puck or a ball. Typically, in the example of hockey sticks, it is the puck contacting portion of the blade which is wrapped with tape sufficiently layered and patterned to impart a "soft" touch or feel for the player when handling or shooting the puck. A similar object may be achieved by wrapping or overlaying the grip or handle portion of sports equipment with tape. Wrapping also may be used to increase the friction between the blade and puck and to assist in imparting a spin to the puck.

Wrapping is so common, particularly in ice hockey, that the National Hockey League official rules make clear that "adhesive tape of any color may be wrapped around the stick at any place for purpose of reinforcement or to improve control of the puck". (National Hockey League Official Rules, Rule No. 20, entitled "Sticks") There is no suggestion in the rules about providing or using other material or methods to wrap a stick.

While wrapping with adhesive tape type material may temporarily improve the durability and handling and feel characteristics of sports implements, including hockey sticks, the tape material is usually porous and deleteriously affected by moisture whether from the surface the game is being played on or from the user's hands. Particularly in the example of adhesive tapes, moisture causes the failure of the adhesive, slipperiness, unwrapping or unevenness of the tape. As in the case of abrasive wear, any of these events requires that the user strip the old material from the implement and rewrap it.

SUMMARY OF THE INVENTION

The present invention comprises a method for improving implements, including sports implements and equipment, particularly hockey sticks. The method includes the steps of applying a heat shrinkable polymeric member to the implement and heating the member sufficiently to shrink it relative to the implement. The present invention is intended to encompass an implement carrying a heat shrinkable member, wherein the member has been shrunken relative to the implement.

It is an object of the present invention to improve the handling characteristics of implements, in the sense of selectively or simultaneously improving both the gripping, holding and manipulating of the implement itself and the handling and control characteristics imparted or relative to objects the implement is designed to move and control.

It is also an object of the present invention to provide for repairing broken implements, as well as reinforcing implements (repaired and new implements) to make them more durable.

It is another object of the present invention to increase the safety of hockey by covering the blade portion of a stick and preventing shattering, splintering and shredding, whereby the ice is not littered with fragments of stick.

More particularly, the present invention comprises a method for improving hockey sticks. The method includes the steps of obtaining and applying a heat shrinkable film cover member to the blade of a hockey stick and exposing the cover member to heat sufficient to shrink it relative to the blade, and conform it to the contour of the blade. In a preferred embodiment, the cover member is generally tubular, taking the form of a sleeve with two opposed, open ends, and may include a textured puck contacting surface. The sleeve may include a thickened or thinned region to change the puck contacting feel of the stick. The textured and thickened or thinned region of the sleeve may overlap and one or the other, or both, may be aligned with the puck contacting portions of the blade.

It is another object of the present invention to provide a method of reinforcing, repairing and improving hockey sticks.

Still another object of the present invention to provide a quick, cost effective, convenient and durable method of reinforcing, repairing and improving hockey sticks which takes the place of wrapping the blade portion of the stick with adhesive tape or other strip material.

Yet another object of the present invention is to provide an improved hockey stick blade covering whereby conventional tape wrapping is unnecessary. An advantage of the hockey stick blade cover and method of the present invention is that blade life is increased and handling performance, both with respect to the stick itself and to the game object, is improved. A feature of the present invention is a heat shrink tube or sleeve which can be slid over the blade portion of a hockey stick and subjected to heat, whereby the sleeve conforms to the hockey stick blade.

A further object of the present invention is to provide for the increased durability or life of a hockey stick blade, wherein a heat shrinkable, generally tubular covering and supporting sheath of polymeric material is used to encompass both sides of at least a portion of the length of the hockey stick blade. An advantage of the polymeric heat shrink blade cover of the present invention is that it provides resistance to wear, resistance to tearing and substantial, close conformation to the blade, including curved blades and blades with curved or straight edges. In some embodiments, the blade cover provides for the uniformly thick overlayment of a blade and, in other embodiments, provides for a cushion effect over all or a portion of the blade.

In one embodiment of the present invention, the sleeve-like blade cover could have a hot melt or contact adhesive coating on all or a portion of its inside surface. This would allow the cover to be adhesively bound to the blade during the heat shrinking process. In another embodiment, the outside surface of the blade cover could be textured or profiled to improve game object handling characteristics and control. Possible patterns include knurling, ribbing or a regular or irregular array of raised and relieved regions. The exterior surface of the cover could carry indicia such as graphics including team names, logos, player names or numbers and the like, and the covers could be made available in various colors. Color and indicia could be impregnated in the body or wall thickness of the cover itself, placed under clear coatings or simply applied or printed to the exterior surface of the cover.

While the sleeve of the present invention is intended to replace wrapping the blade with conventional adhesive tape strip material, it encompasses wrapping a blade with heat shrinkable strip material with a hot melt adhesive layer on the inside.

Other advantages of the present invention are that the sleeve-like cover member may be made from a polymer selected to improve toughness and compressibility to solve the current problem with soft tape type coverings which absorb energy under impact, absorb moisture, and tear easily. The blade cover of the present invention is more easily attached to the hockey stick blade than tape, i.e. wrapping conventional strip type material may be difficult and time consuming in the first place, and the result can provide an uneven game object contacting surface, even wherein some unevenness or surface texture is desired to increase the friction between the blade and game object.

Further objects, features and advantages of the present invention will be understood with reference to the following specification and to the appended drawings and claims.

BRIEF DESCRIPTION OF THE DRAWINGS

FIG. 1 depicts the placing of the heat shrinkable blade cover member of the present invention on the blade portion of a hockey stick.

FIG. 2 depicts the heat shrinkable cover member loosely placed around a blade.

FIG. 3 depicts the application of heat to the cover.

FIG. 4 depicts the shrinking of the cover and additional steps in the shrinking, i.e., exposure to heat or heating, process.

FIG. 5 depicts the heat shrinkable cover member shrunken about the blade portion of a stick.

FIG. 5a is a cross-sectional view taken along line 5a—5a of FIG. 5.

FIG. 6 depicts another embodiment of the heat shrinkable cover sleeve member of the present invention.

FIG. 7 depicts another embodiment of the cover sleeve of the present invention.

FIG. 8 depicts another embodiment of the cover sleeve of the present invention.

DETAILED DESCRIPTION OF THE PREFERRED EMBODIMENT

In this detailed description, unless specifically described otherwise, means for fastening, attaching or connecting the heat shrinkable sleeve 10 of the present invention to an implement to form the implement and sleeve assembly is intended to encompass conventional fastening means such as appropriate contact or hot melt adhesives or epoxies, or, in the instance of implements made of or coated with plastics or fiberglass, sonic welding. The hockey stick depicted and described herein is intended to be representative of all types of hockey sticks as well as other sports equipment such as tennis rackets, brooms or sweepers used in the sport of broom-ball, golf clubs, baseball bats, lacrosse sticks, squash rackets and the like. Additionally, the cover sleeve of the present invention and the method of using it might be used for implements or equipment such as shovels, rakes, gun stocks, canoe paddles, oars and any like implement wherein it would be desirable to conveniently encompass a portion thereof to provide improved gripping and handling of the implement, as well as improved control of an object which the implement contacts and moves. Generally, unless specifically otherwise disclosed or taught, the materials for forming the cover sleeve of the present invention may be selected from appropriate materials or mixtures of materials including various polymers (polyurethane, polyester, polyolefin (of the general formula $C_nH_{2n}$ etc.), vinyls, plastics and the like which contract when heated, as long as sufficient heat shrinking properties are provided by the selected material. The type of material, the thickness, hardness, exterior or interior texture or profile patterns and color of the cover sleeve can be selected as desired, as can the size of the portion of the implement, piece of sports equipment, hockey stick or blade to be covered.

Referring then to the drawings, particularly FIG. 5, the heat shrinkable cover sleeve 10 of the present invention is depicted installed on a hockey stick 12. Such sticks 12 are well-known and typically include an elongated shank portion 14 with a puck contacting blade 16 at one end (the lower end) and a handle or gripping region (not shown) at the other (upper) end. The blade 16, and its edges, may be straight or curved and includes a heel 18, a toe 20 and a generally central puck or other game object contacting region 22. In use, either side of the blade 16 may be used to contact a puck (not shown).

The cover sleeve 10 depicted in FIGS. 1–5 is a generally tubular and sheath-like having a continuous cylindrical wall with an exterior surface 24, an interior surface 26 and two open ends 28, 30. The hollow center of the sleeve 10 is unobstructed. As depicted in FIG. 5a, since either side of the blade 16 may contact the puck, the sleeve 10 has two puck contacting faces, designated for convenient reference the front face 32 and the rear face 34. The sleeve 10 may be extruded in its tubular form or it may be formed from a sheet of selected material which is rolled until two edges overlap and may be joined together.

Referring to FIGS. 6–8, modified embodiments of the sleeve 10 of the present invention are depicted. The modified embodiments are commonly numbered, broadly providing the same generally tubular, cylindrical cover sleeve 10 as is depicted in FIGS. 1–5. Referring to FIG. 6, the sleeve 10 has a single puck contacting face 35 or is generally semi-cylindrical. The opposite, back side of the sleeve 10 is relieved in the center to provide a strap-like band 38, 40 at each end. The bands 38, 40 are continuous with the puck contacting face 35 of the sleeve 10, and the sleeve 10 includes two long free edges 42, 44 extending continuously between the bands 38, 40. When installed on a blade 16, the two long edges 42, 44 will lie generally along the top and bottom edges of the blade 16, respectively.

FIG. 7 depicts another modified form of the sleeve 10. The modification of FIG. 7 could be incorporated into either the sleeve 10 depicted in FIG. 1 or the sleeve 10 depicted in FIG. 6. Referring to FIG. 7, the puck contacting face portion 32 (FIG. 5a; analogous to 35 in FIG. 6) of the sleeve 10 is thicker than the remaining portions of the sleeve 10. While one uniformly thickened region or face is depicted in FIG. 7, the sleeve 10, any portion of the sleeve 10 could be thickened to provide a different, selected puck contacting feel for a hockey stick (e.g., a different feel for forehand and backhand strokes or shots) or to provide increased durability along the bottom edge of the blade 16.

Referring to FIG. 8, any of the embodiments of the sleeve 10 depicted in FIG. 1, FIG. 6 or FIG. 7 may be modified as shown in FIG. 8 wherein a puck contacting face 49 of the sleeve 10 is embossed or relieved to provide a textured exterior surface. Although a regularly patterned array of raised regions 36 is depicted, any pattern or arrangement of profiled, relieved or embossed regions may be used to provide a textured puck contacting surface to increase the friction between the puck and the sleeve 10 carried on the blade 16, thereby providing enhanced control characteristics. Such profiled or textured surfaces may be specifically selected to complement the knurling or texture of a puck and may be achieved by adding particulates or filaments of non-thermoplastic polymers, inorganic material, graphite, metal, metallic-alloys or the like to the polymer forming the heat shrinkable sleeve.

FIGS. 1–5 depict the method of using the heat shrinkable sleeve 10 of the present invention. In use, any desired length of sleeve is selected or cut. The cover sleeve 10 is first slipped over the hockey stick blade 16 toe end 20 as depicted in FIG. 1. Before sliding the cover sleeve 10 in place, the blade 16 should be clean and dry. Blade edges should be generally smooth and, if the blade 16 is cracked or broken, edges of the crack should be fitted or matched as smoothly and closely as possible. The sleeve 10 may be positioned anywhere along the length of the blade 16 as suggested by arrow A in FIG. 2, although generally the sleeve 10 will be positioned generally centrally along the length of the blade 16, covering a large portion of the surface area of the blade 16 on both sides. Typically, more of the blade surface would be covered than left uncovered, and the sleeve 10 would extend to closely adjacent to the free toe end 20 of the blade 16. As depicted in FIG. 3, the blade 16, particularly the sleeve 10, is placed near a heat source, represented by the propane torch 44 shown in FIG. 3. Although a torch 44 is depicted, the heat source could be a home hair dryer, heat gun, oven top, or any other appropriate heat source. As shown in FIG. 4, as heat is applied, the sleeve 10 shrinks, conforming tightly and closely to the blade 16. Preferably, the heat should be applied initially at the central portion of the sleeve 10 and moved outwardly along arrow B toward the ends 28, 30 as depicted in FIG. 4. As shown in FIG. 5, once the heat shrinking is completed, the sleeve 10 is securely conformed and attached to the blade 16. The stick 12 is now ready for use.

Representative examples of heat shrinkable tubing or tubular sleeve material which would be suitable for use in the method of the present invention include commercially available material including the following: flexible polyolefin tubing such as FP-301VW tubing manufactured by 3M, Electrical Products Division, Austin, Tex.; IMCSN medium wall heat shrinkable tubing of cross-linked polyolefin, made by 3M, Electrical Products Division, St. Paul, Minn.; or PO-135 tubing, manufactured by the Markel Corporation, Morristown, Pa. The latter tubing is an extruded, thermally stable Class B (130° C.) heat shrinkable, flexible polyolefin. It, the noted 3M material and other commercially available heat shrinkable tubular products are supplied in expanded sizes and have about a 2:1 heat shrink ration, i.e., shrink about fifty percent in diameter when heated. The wall thickness is generally proportional to the degree of recovery. Typically, the Markel tubing, and other heat shrinkable tubing material, is used as a covering material for electrical splices, connections and the like, but it may be used over irregular shapes. According to the Markel literature, when heat is applied at 200° C., the Markel tubing will recover with three to five minutes. At a minimum activation temperature of 120° C. the time to reach maximum shrinkage increases, and temperatures in excess of 250° C. may diminish the effectiveness of the tubing. The tubing mentioned in this paragraph is intended to be exemplary of heat shrinkable material suitable for use in the present invention. The wall of the tubular cover sleeve used in the present invention may have a thicker or thinner wall or wall portions, may be of different lengths and may have different inner and outer diameters.

Any references to first and second or front and rear sides, ends or portions (i.e., ends 28, 30) of the sleeve 10 are made for convenience of description. The body of the sleeve 10 could be entirely or partially textured on the inside and/or the outside. The sleeve 10 could have two or more of the strap-like members 38, 40 depicted in FIG. 6. Particularly for hockey stick blades or grips of implements, the sleeve 10 could take the form of a sock, wherein one of the ends 28, 30 is closed. When used with an appropriate adhesive (not shown, but applied to the inside 26 or one side of the sleeve 10), the sleeve 10 could take the form of a patch member to be applied or overlaid on one or both sides of the blade 16 of a hockey stick 12. Additionally, the playing cover sleeve 10 of the present invention could be applied to the playing surface of the blade as a single piece by any suitable process including injection molding, dip coating and the like. Although not depicted, it should be understood that the sleeve 10 could be used on the handle portion of a hockey stick 12, as well as on the handle or grip portion of other items of sports equipment or implements.

Although a description of the preferred embodiment has been presented, various changes including those mentioned above could be made without deviating from the spirit of the present invention. It is desired, therefore, that reference be made to the appended claims rather than to the foregoing description to indicate the scope of the invention.

What is claimed is:

1. A method for improving a blade of a hockey stick comprising the steps of:

applying a heat shrinkable member to the blade;

exposing said heat shrinkable member to a source of heat sufficient to shrink said heat shrinkable member, whereby said heat shrinkable member conforms to the blade.

2. The method according to claim 1, wherein, when applied to the blade, said heat shrinkable member wraps the blade.

3. The method according to claim 2, wherein at least a portion of said heat shrinkable member is generally tubular.

4. The method according to claim 2, wherein said heat shrinkable member comprises a sleeve.

5. The method according to claim 4, wherein said sleeve is generally tubular.

6. A post-manufacture method for repairing and reinforcing a blade of a hockey stick and for improving puck handling characteristics and durability of the blade comprising the steps of:

applying a heat shrinkable, generally tubular cover sleeve to the blade;

heating said cover sleeve to shrink said cover sleeve relative to the blade.

7. The method according to claim 6, wherein said cover sleeve has a textured surface aligned with the blade.

8. The method according to claim 7, wherein the textured surface is aligned with a puck contacting surface of the blade.

9. The method according to claim 8, wherein said cover sleeve comprises a generally cylindrical body formed by a substantially continuous wall with an inside and an outside surface, said body having two opposed open ends and being hollow.

10. The method according to claim 9, wherein said outside surface includes a textured region.

11. The method according to claim 12, wherein said cover sleeve has a length extending between said ends, and wherein said heating is initiated generally in a middle area of said length.

12. A cover sleeve for a blade of a hockey stick, said cover sleeve comprising a polyolefin sleeve body formed by a wall with an inside and an outside surface, said sleeve body having two open ends and being heat shrinkable, said outside surface including a textured region.

13. The cover sleeve according to claim 12, wherein at least a part of said inside surface carries a hot-melt adhesive.

14. The cover sleeve according to claim 12, wherein the blade has a puck handling surface and said textured region is adapted for alignment with the puck handling surface.

15. A hockey stick comprising a shank, a blade and a cover sleeve on the blade for reinforcing the blade and enhancing controlling a puck, said cover sleeve comprising a single-piece, generally tubular sleeve body formed by a wall with an inside surface and an outside surface, said sleeve body having two open ends and being heat shrinkable, at least a portion of the outside surface being a puck contacting surface and at least a portion of the inside surface carrying a hot-melt adhesive, wherein said cover sleeve has been exposed to heat and substantially conforms to at least part of the blade.

16. The hockey stick according to claim 15, wherein said cover sleeve is formed by a polymer selected from the group consisting of polyurethanes, polyesters and polyolefins having the general formula $C_nH_{2n}$.

17. The hockey stick according to claim 16, wherein at least part of the puck contacting surface is textured.

18. The hockey stick according to claim 17, wherein the textured part of the puck contacting surface includes an array of relieved regions.

19. The hockey stick according to claim 17, wherein the textured part of the puck contacting surface includes an array of embossed regions.

* * * * *